Oct. 14, 1930.　　　　G. G. CARLSON　　　　1,778,245
WINDSHIELD WIPER
Filed Nov. 5, 1929
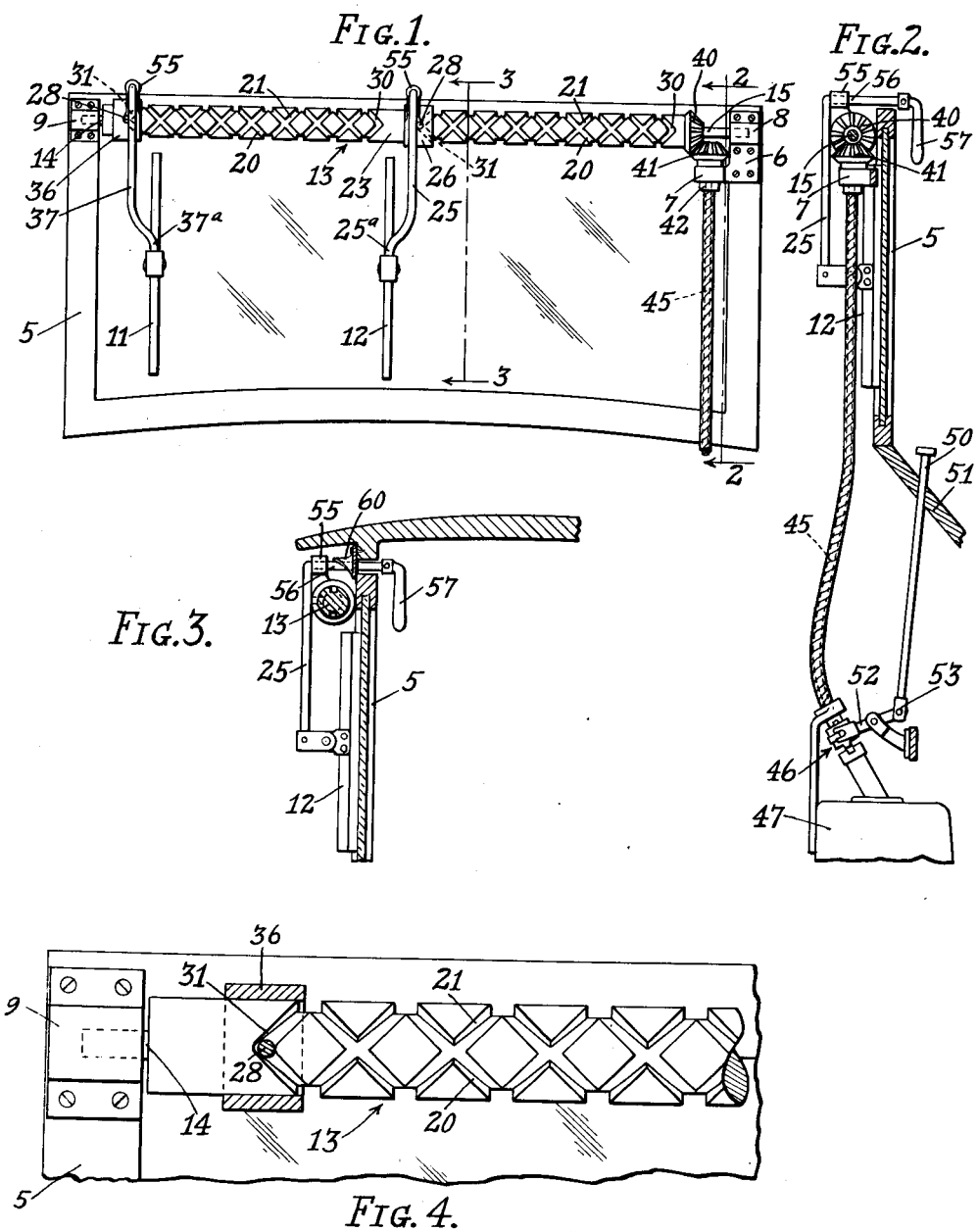
INVENTOR.
Gustaf G. Carlson
BY
Robt. W. Pearson
ATTORNEY.

Patented Oct. 14, 1930

1,778,245

UNITED STATES PATENT OFFICE

GUSTAF G. CARLSON, OF LOS ANGELES, CALIFORNIA

WINDSHIELD WIPER

Application filed November 5, 1929. Serial No. 404,907.

This invention relates to a mechanical wind shield wiper adapted to be operated from the gear box of a self-propelled vehicle.

An object of the invention is to provide a very durable, dependable wind shield wiper, the operating parts of which will not wear out or become defective on account of continued use for a long period of time.

A further object of the invention is to provide improved means for simultaneously operating a plurality of wiping elements in such a manner as more rapidly to remove from the wind shield, any moisture or other obstruction to vision caused by inclement weather.

Other objects and advantages of the invention are to provide a wind shield wiper construction which may be very securely mounted upon the windshield and which may be conveniently applied to the wind shield of self-propelled vehicles at a small expense.

Other objects, advantages and features of invention may hereinafter appear.

Referring to the accompanying drawings which illustrate what is at present deemed to be a preferred embodiment of the invention, Fig. 1 is an elevation of the invention looking toward the inner side of a wind shield upon which it is mounted.

Fig. 2 is a sectional view thereof on line 2—2 of Fig. 1.

Fig. 3 is a sectional view on line 3—3 of Fig. 1.

Fig. 4 is an elevational detail illustrating the connection between the cross threads at one end of the actuating shaft.

Referring in detail to the drawings, to the upper right hand portion of the wind shield 5, as viewed in the drawings, is secured a bearing plate 6 which is provided at its lower end with an inwardly projecting bearing extension 7 and which is also provided with the bearing 8. At the other side of the wind shield is provided a correspondingly located bearing 9.

The means for actuating the wiping elements 11 and 12 comprises an actuating shaft 13 provided at one end with an axially projecting bearing pin 14 and at its other end with an axially projecting bearing pin 15. the latter bearing pin being longer than the former in order to provide more room for the driving gears which will presently be described.

The actuating shaft 13 is provided with cross threading consisting of the right hand threads or grooves 20 and the left hand threads or grooves 21. This cross threading is arranged in two sections lengthwise the shaft, thus leaving at the center of the shaft an unthreaded space 23.

Viewing the actuating shaft 13, as seen in Fig. 1, the wiping element 12 is carried by an arm 25 which is mounted upon a carriage block 26. Said carriage block 26 slidably engages the shaft 13 around which it extends with a working fit, and is provided with an internally projecting pin 28, the inner end of which projects into the grooves 20 and 21 of the right hand portion of shaft 13. Said grooves 20 and 21 are patterned after the grooves or threads of the well known "Yankee screw-driver" and are connected at their ends by the uniting grooves 30 and 31, so that the driving pin 28 of the wiper arm 25 may be made to reciprocate uninterruptedly when the shaft 13 is continuously rotated in one direction, the direction of rotation, of course, being such as to tend to hold the wiping elements 11 and 12 in contact with the surface of the wind shield.

With the carriage block 26 cooperates the companion carriage block 36 upon which is mounted the arm 37 which carries the wiping element 11. Said arms 25 and 37 are similarly constructed, but are reversely arranged, the arms 25 having a deflected terminal portion 25ª and the arm 37 having a like deflected terminal portion 37ª. These deflected portions are directed toward each other and upon their extremities are mounted the wiping elements.

The purpose of the reverse arrangement of the arms 25 and 37 is to support the wiping elements 11 and 12 in such a manner that when their respective carriages 26 and 36 are reciprocated by the continuous rotation of the actuating shaft 13 the central portion of the wind shield opposite to the unthreaded part 23 of shaft 13, will be wiped first by one and then by the other of the wiping elements 11 and 12.

The driving means, by preference and as shown, consists of a bevelled gear 40 fixed to one end of the actuating shaft 13, said gear 40 being in mesh with a driving bevelled gear 41 which has a shank portion 42 supported by the bearing 7. Said driving gear 41 is rotated by a flexible shaft 45, which, by means of a clutch 46 is operatively connected with or disconnected from the gearing (not shown) contained within the gear case 47. Said clutch 46 may be operated in any well-known manner, for example by means of a manually operable thrust bar 50 mounted upon the instrument board 51 and operatively connected with the clutch lever 52 by means of a connection 53.

Referring to certain details of construction, the carriages 26 and 36 are of substantially the same construction, and are each provided with an upward extension 55 to which is secured wiper arm 25 (or 37) by means of a spring actuated snap pin 56.

In order to swing the wiping elements 11 and 12 into a position where they are entirely removed from the field of vision, an arcuate handle 57 is secured to each of said extensions 55 by the same pin 56, as shown, that secures the arm 25 (or 37). Said handle as shown in Fig. 3, is adapted to pass behind the upper portion of the windshield. A flexible flap 60 is suspended from the auto top 61 to bridge the space above the windshield in order to keep out the weather.

I claim:

In a wind shield wiper, an actuating shaft having a central unthreaded portion and a cross threaded portion at each side of said unthreaded portion; there being at each side of said unthreaded portion a wiping member provided with a wiper, and a carriage whereon said wiper is mounted, said carriage having an operative connection with the cross threaded portions of said shaft whereby said wiper is reciprocated to move to and from the central portion of said unthreaded part of the shaft and means to rotate said shaft, said wipers being mounted in a centrally offset manner with relation to said carriages to insure their engagement with the entire central portion of the windshield.

In testimony whereof I hereunto affix my signature.

GUSTAF G. CARLSON.